2,709,258

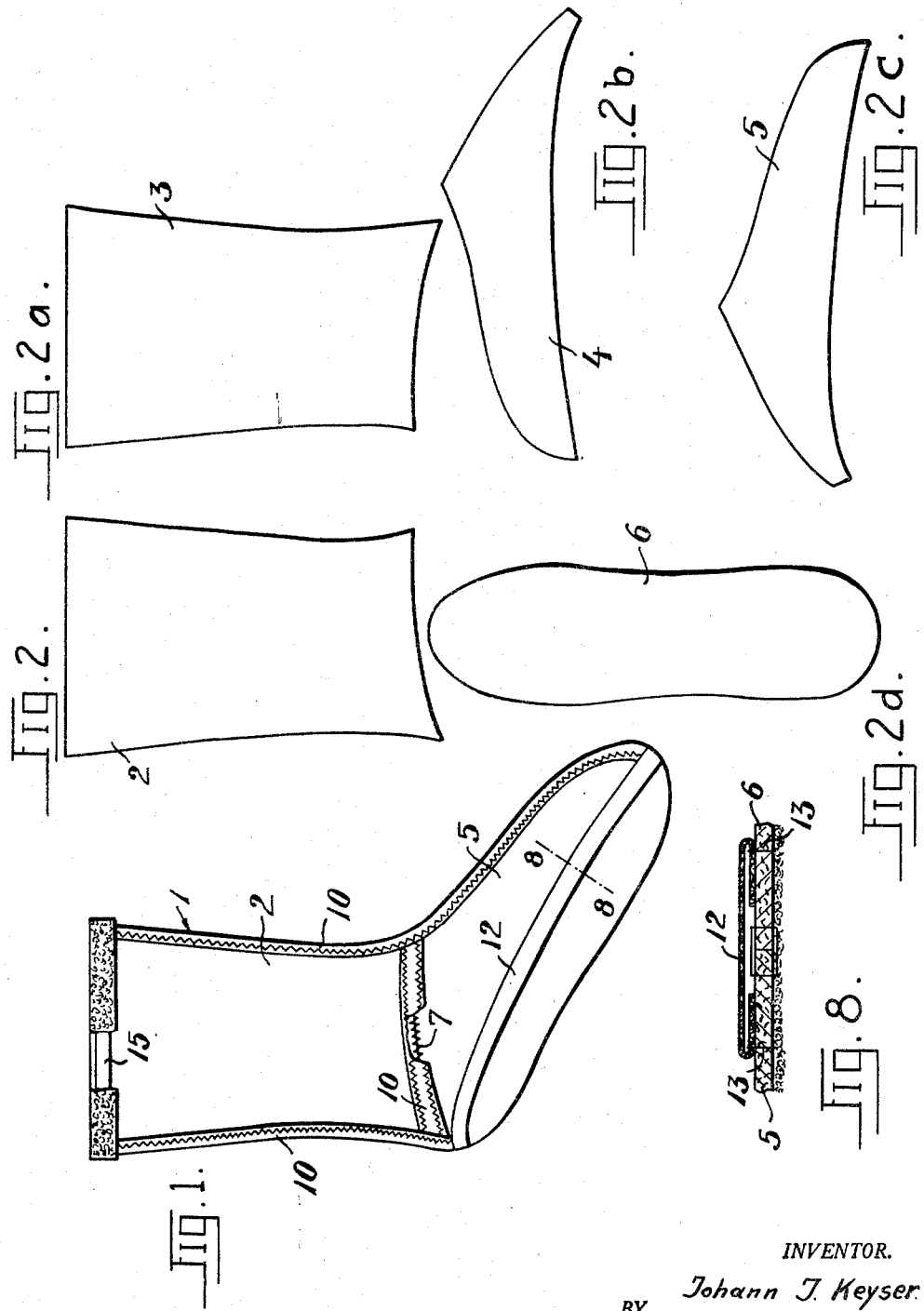

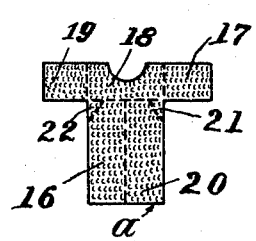
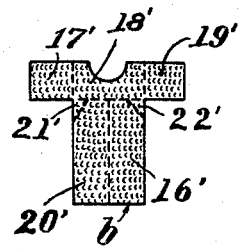
Fig. 3      Fig. 3a
  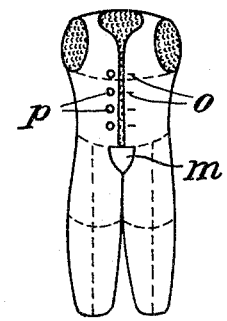
Fig. 4    Fig. 4a    Fig. 5
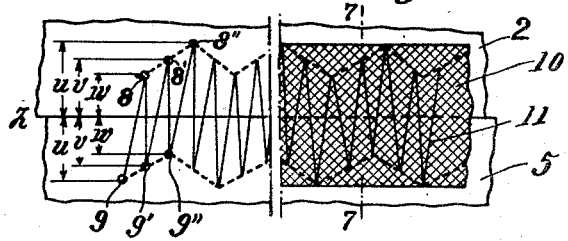 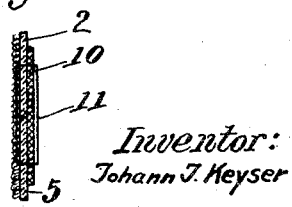
Fig. 6    Fig. 6a    Fig. 7
Inventor:
Johann J. Keyser
by
Patent Agent United States Patent Office
2,709,258
Patented May 31, 1955

FUR GARMENTS AND METHOD OF MAKING THE SAME

Johann J. Keyser, Aarau, Switzerland

Application November 26, 1951, Serial No. 258,274

Claims priority, application Germany April 9, 1951

6 Claims. (Cl. 2—65)

The present invention relates to cold weather apparel and, more particularly, to cold weather apparel made from fur covered animal skins. This application is a continuation-in-part application of my co-pending patent application Ser. No. 192,135 filed October 25, 1950, now Patent No. 2,687,529.

It is a well known fact and can easily be observed in the animal world that a fur protects a body against cold best when it is in direct contact with the skin of said body. Consequently, when using fur covered animal skins for protecting human beings against the implements of cold weather, efforts have been made to bring the fur as close to the skin of the respective person as possible. However, the methods of processing pelts and piecing the furs together as practiced prior to my invention have proved unsuitable for making fur covered socks, underwear, or the like in such a manner that the fur side thereof can be worn directly on the skin. The reason for this consists primarily in that the processed pelt is too stiff, lacks elasticity, and that the direct contact between the fur and the skin causes skin irritations. Furthermore, the fur covered skin cannot be washed like regular textile underwear without impairing the usefulness thereof. Thus, fur covered animal skins were used merely as a warming supplement in form of fur coats, jackets, vests, foot sacks, etc. to be worn either over customary textile clothing or they were lined with textiles. In other words, with these known fur covered clothing pieces, the fur never was in direct contact with the human skin, while the fur covered wearing apparel became worthless when subjected to regular washing. On the other hand, these known fur covered textile clothing pieces are relatively heavy and bulky, thus considerably handicapping the wearer who has to perform outside work in cold weather.

It is, therefore, an object of this invention to provide wearing apparel of fur covered animal skins which will overcome the above mentioned drawbacks.

It is another object of this invention to provide fur covered clothing pieces such as socks, underwear of any type, etc. which can be worn directly on the skin, without irritating the skin or inconveniencing the wearer.

It is also an object of this invention to provide a wearing apparel from fur covered animal skins which will have at least the natural elasticity of the processed skin.

It is a still further object of this invention to provide wearing apparel as set forth in the preceding paragraphs, which can be washed and dried like regular corresponding textile pieces without impairing the usefulness of the respective wearing apparel.

It is still another object to provide a relatively simple method of making fur covered wearing apparel of the above mentioned type.

These and other objects and advantages of the invention will appear more clearly from the following specification in connection with the accompanying drawings in which:

Fig. 1 illustrates a fur covered sock according to the present invention.

Figs. 2, 2a, 2b, 2c, and 2d represent the cut individual animal skin sections making up the sock of Fig. 1.

Figs. 3 and 3a respectively illustrate the front and rear part of an undershirt made from fur covered animal skins in conformity with the principles of the present invention.

Figs. 4 and 4a show the manner in which an overall undergarment according to the invention is made up.

Fig. 5 represents the completed undergarment of Figs. 4 and 4a.

Fig. 6 is a view of a connection according to the present invention of two fur covered animal skin portions.

Fig. 6a is a connection similar to that of Fig. 6 but using an additional connecting member in form of a ribbon.

Fig. 7 represents a section along the line 7—7 of Fig. 6a.

Fig. 8 is a section along the line 8—8 of Fig. 1 but on a scale larger than that of Fig. 1 and materially increased over the actual dimensions.

*General arrangement*

In order to provide wearing apparel of fur covered animal skin which can be worn with the fur side directly on the human skin, it has, after extensive tests, been found according to the present invention that of the numerous generally available animal skins only lamb skin represents a suitable starting material for the wearing apparel involved. These tests have shown that lamb skin not only in the structure of its leather, i. e. softness, smoothness, porosity, tensile strength and elasticity, but also with regard to its wool structure, i. e. softness, air permeability, compatibility and failure to irritate human skin, combines all those features which, while immaterial for the preparation of heretofore conventional outer fur garments, are indispensable for the making of fur underwear. It will be obvious that the softness of the fur covered leather must under all circumstances be maintained if the undergarment made therefrom is to be worn directly on the human skin. This fact has lead to another finding according to the present invention, namely that the stretching of animal skin over specific forms, as is done for instance in connection with the shaping of animal skulls and hand muffs, destroys the elasticity of the animal skin to such an extent that it becomes unsuitable as a component of fur underwear.

Even if the elasticity of the lamb skins can be maintained and the skins after having been tanned are pieced together according to customary furrier methods to the desired wearing apparel, e. g. a sock, tests have proved that the apparel will not stand up for any appreciable length of time to alternating stresses, especially the pulling in different directions, and consequently such piece of fur covered wearing apparel is likewise of no practical value.

The above mentioned difficulties in creating a useful durable wearing apparel from fur covered animal skin has been solved according to the present invention by the combination of the following three factors, namely (a) the selection of very fine lamb skin, preferably "Montevideo lamb," as starting material; (b) after tanning the lamb skins, to cut the same in such a manner as to preserve their elasticity, in other words, to cut the skins in the direction of their greatest elasticity; and (c) the interconnection of the individual skin pieces by a zigzag sewing method which, while not customary in the furrier trade with heretofore known fur garments, will not only improve the elasticity of the finished wearing apparel but will also prevent a tearing of the leather along the seam. This elasticity is of particular importance in connection with such wearing apparel as socks, especially at the step-up and the ankle area while putting the socks on the feet.

According to a further development of the invention, the zigzag sewing method as varied in such a manner that the stitching holes on each side of the abutting edges of the skins to be connected together are located on an alternately ascending and declining line. In this way, the elasticity of the seam is further increased while the possibility of tearing along the seam is further reduced.

In conformity with a still further development of the invention, the resistance of the wearing apparel against pull and tear stresses may be further increased by reinforcing the seams, e. g., in case of socks, at the step-up and ankle area and at the sole, by ribbons of a material which while being strong, has a certain elasticity. Materials known under the trade-marks "nylon" and "Perlon" are particularly suitable for such reinforcing ribbons. These ribbons are preferably made and applied so that their warps and woofs run in diagonal direction with regard to the abutting edges of the respective connecting skin pieces. The connection of the skin pieces with each other and the connection of the ribbon at the seams is preferably effected with strong elastic synthetic threads, e. g. of the above mentioned "nylon" or "Perlon" material, which threads may or may not be covered up by the respective ribbon.

Whenever desired, also triangular skin pieces may be inserted at certain places, e. g. between the legs, underneath the arm pits, etc. in order to reduce the stress at such points.

Since, as a rule, the individual skin sections or portions of one and the same wearing apparel have come from more than one animal, and in as much as it is only natural that there are differences in the natural skin structure of the individual animals, there may be some although small differences in the elasticity of the skin sections making up the respective wearing apparel. To equalize and smoothen out such differences in order to obtain practically the same elasticity throughout the wearing apparel, it has been found advantageous according to the present invention, after the skin sections have been sewn together, to turn the leather side of the wearing apparel, e. g., a sock, outwardly, to moisten the leather side with clear water, then to turn the leather side inwardly, and finally to place the thus turned wearing apparel with its leather side on a respective form for drying. It may be emphasized in this connection that the placing of the wearing apparel on the said form has nothing to do with the shaping of the wearing apparel but, as mentioned above, merely serves to eliminate any possible structural tensions in the skin sections. The desired shape itself of the wearing apparel is obtained by the respective cut of the skin sections. After the wearing apparel has dried, it is again turned so that the fur is on the inside.

In order to increase the resistance of the fur side against humidity in general and perspiration in particular, the fur side of the respective wearing apparel may according to the present invention be impregnated with moisture repellent means, e. g. silicone.

Structural arrangement

Referring now to the drawings and Fig. 1 thereof in particular, this figure illustrates a fur sock made according to the present invention. More particularly, as starting material is used lamb skins of finest wool structure, as for instance the so-called Montevideo lamb skins, which are double-chromed and processed to a fine thickness similar to glacé kid glove leather so that the skins are particularly soft, yieldable and smooth and easily adapt themselves to the human skin surface to be covered thereby. Furthermore, the lamb skins must be so processed that they will be free from chemicals which might cause irritation of the human skin that may be in direct contact therewith for a longer period of time. Also, the lamb skins must not be hygroscopic and, therefore, may be treated with moisture repellents such as silicone.

In order to manufacture a sock of the type shown in Fig. 1 from the thus processed skins, five pieces 2, 3, 4, 5 and 6 are cut out therefrom, and this cutting is effected in the direction of the greatest elasticity of the skins. These pieces which are shown in Figs. 2 to 2d are then sewn together by a zigzag seam as shown for instance at 7. While the seam 7 is a regular zigzag seam, it is preferable to use a zigzag seam as shown in Fig. 6. The zigzag seam illustrated therein is such that the stitching lengths 8—9, 8'—9', 8"—9", etc. equal each other, and that the distances between two successive stitches are the same, while the distances of the stitching holes 8, 8' and 8" from the abutment edge $z$ equal $w$, $v$ and $u$ respectively, i. e. are different from each other. The same applies to the distances of the stitching holes 9, 9' and 9" from the abutment edge $z$. Thus, expressed in different words, the stitching holes on both sides of the abutment edge $z$ are respectively located on two spaced parallel lines with alternately ascending and declining sections. It will be appreciated that with such a seam, a tearing at the stitching holes is practically impossible in view of the relatively great distance between those two successive stitching holes which are located at the same distance from the abutment edge $z$ and at the same side thereof. On the other hand, the undulated course of the seam assures the necessary and desired elasticity.

In order further to strengthen the seam areas, a reinforcing ribbon 10 may be placed over the seam areas and sewn to the respective fur covered skin portions. In order not to impair the elasticity at the seam areas by such reinforcing ribbon, the ribbon is preferably woven so that the warp and woof threads extend diagonally with regard to the abutment edges of the two respective interconnected skin portions. This will allow a distortion of the ribbon in the direction of the seam as well as perpendicular thereto. If the ribbon 10 and also the thread 11 are made of fully synthetic fibers, e. g. of the material known under the trade-marks "nylon" and "Perlon," which materials are particularly tear resistant and elastic, the yieldability and the resistance against tear at the seam areas will equal those of the skin itself, thereby assuring that the seams will last as long as the skins.

The ribbons 10 may be connected to the skins in various ways. As shown in Fig. 1, two zigzag seams connect the ribbons 10 to the respective interconnected skin portions 2, 3, 4, and 5. The ribbon 12 overlying the seam between the sole 6 and the skin portions 4 and 5 is so connected to the same that the connecting thread 13 is not visible from the outside. It is, of course, understood that, if desired, the connecting method for ribbon 12 may be the same as that used for ribbon 10, and, similarly, the connecting method for ribbon 10 may, if so desired, be replaced by the connecting method for ribbon 12.

The upper marginal portion of the sock is preferably folded over and sewn on so as to form a hem after an elastic band 15 has been placed underneath the folded over portion. The band 15 may for instance be of rubber.

Referring now to Figs. 3 and 3a, these figures respectively represent the front part $a$ and back part $b$ of a fur undershirt according to the present invention. Similar to the fur sock described above, each of the parts $a$ and $b$ is composed of a plurality of skins and/or a plurality of skin portions 16 to 22 and 16' to 22' respectively which are cut and connected with each other in a manner described above in connection with Fig. 1 so as to make up the front and back parts of an undershirt of a desired shape. These parts $a$ and $b$ after having been cut to shape are then sewn together so as to form the desired fur covered undershirt. In some special instances, they may also be pasted together by special pasting means adapted to stand up under repeated washing. The fur side is, of course, again on the inside of the wearing apparel. Furthermore, the triangular pieces 21 and 21' may be replaced by a single piece, and the same may be done with the pieces 22, 22' and other pieces.

Figs. 4, 4a and 5 show another example of fur covered underwear according to the present invention. This piece of underwear, which in its completed form represents an overall undergarment, shown in Fig. 5, comprises a front part k and a back part l. Each of these parts is again composed of a plurality of individual skins cut in the direction of the greatest elasticity and sewn together according to the principles outlined above in connection with the sock of Figs. 1 to 2d. Furthermore, reinforcing triangular pieces m may be provided. After having been cut to shape, the parts k and l are sewn together along their respective outer edges so as to form the garment of Fig. 5. Finally, the garment of Fig. 5 is provided with button holes o and buttons p or, if preferred, with a zipper or other convenient closing means.

It is, of course, understood that the present invention is, by no means, limited to the particular wearing apparel shown in the drawings but that any other type of wearing apparel, e. g. the various types of men's and women's underwear may be made according to the present invention. It is furthermore to be understood that the present invention is not limited to the specific arrangement of the skins as shown in the drawings but also comprises any modifications within the scope of the appended claims.

What I claim is:

1. A method of making wearing apparel having a fur covered inside and being adapted to be worn directly on the human skin, which includes the steps of cutting lamb skins with finest wool structure which have been processed to fine kid glove leather thickness to shape in conformity with the shape of the apparel to be made, said cutting being effected in the direction of the greatest elasticity of the skins, sewing the individual skin sections thus cut together by a zigzag seam running back and forth across the respective abutting edges of the respective sections to be connected with each other, thereafter placing ribbon means above said zigzag seams on the leather side of the thus connected skin sections and sewing said ribbon means along inverted edge portions thereof to said skin sections by seams separate from said zigzag seams and arranged laterally of said zigzag seams, treating at least some portions of the fur side with a moisture repellent, and turning the fur side of the apparel inwardly.

2. A wearing apparel having a fur covered inside adapted to be worn directly on the skin of a person, which comprises in combination, a plurality of lamb skin sections having a fine wool structure and arranged in edge to edge abutment, each two adjacent sections being sewn together by a zigzag seam running back and forth across the abutting edges of the respective skin sections, and elastic ribbon means sewn to the leather side of at least two skin sections which are in abutment with each other and covering up at least one of said seams.

3. A wearing apparel according to claim 2, in which the warp and woof threads of the ribbon means are located diagonally with regard to the abutting edges covered thereby.

4. A wearing apparel having a fur covered inside adapted to be worn directly on the skin of a person, which comprises in combination, a plurality of lamb skin sections having a fine wool structure and arranged in edge to edge abutment, each two adjacent sections being sewn together by a zigzag seam running back and forth across the abutting edges of the respective skin sections while the stitching holes of at least one seam are located along two substantially parallel lines with alternately ascending and declining sections, and elastic ribbon means sewn to the leather side of at least two skin sections which are in abutment with each other and covering up at least one of said seams.

5. A wearing apparel having a fur covered inside adapted to be worn directly on the skin of a person, which comprises in combination, a plurality of lamb skin sections having a fine wool structure and arranged in edge to edge abutment, each two adjacent sections being sewn together by a zigzag seam running back and forth across the abutting edges of the respective skin sections, and elastic ribbon means arranged on the leather side of said apparel and covering up at least one of said seams, said ribbon means being connected to said apparel by zigzag seams extending completely through said ribbon means so as to be visible from the outside thereof.

6. A wearing apparel having a fur covered inside adapted to be worn directly on the skin of a person, which comprises in combination, a plurality of lamb skin sections having a fine wool structure and arranged in edge to edge abutment, each two adjacent sections being sewn together by a zigzag seam running back and forth across the abutting edges of the respective skin sections, and elastic ribbon means arranged on the leather side of said apparel and covering up at least one of said seams, said ribbon means being connected to said apparel by seams covered up by portions of said ribbon means so as not to be visible from the outside of said apparel.

References Cited in the file of this patent

UNITED STATES PATENTS

| Number | Name | Date |
|---|---|---|
| 116,578 | Falkenau | July 4, 1871 |
| 501,478 | Jaros | July 11, 1893 |
| 1,195,814 | Higgins | Aug. 22, 1916 |
| 1,663,376 | Koller | Mar. 20, 1928 |
| 1,715,747 | Falck | June 4, 1929 |
| 1,896,183 | Manson | Feb. 7, 1933 |
| 2,066,282 | Van Voorhis | Dec. 29, 1936 |
| 2,234,138 | Kritchevsky | Mar. 4, 1941 |
| 2,398,510 | Wilson | Apr. 16, 1946 |
| 2,545,658 | Gellman et al. | Mar. 20, 1951 |